No. 627,166. Patented June 20, 1899.
C. A. WHITE.
TEA BALL.
(Application filed June 26, 1896.)
(No Model.)
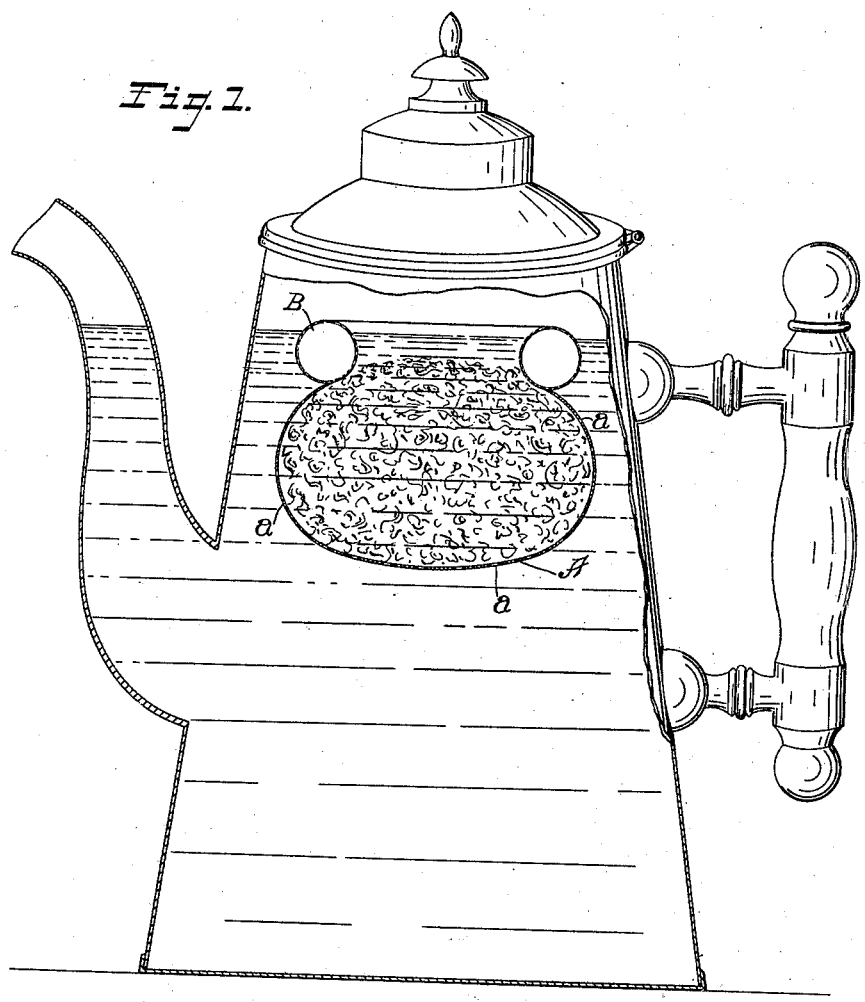
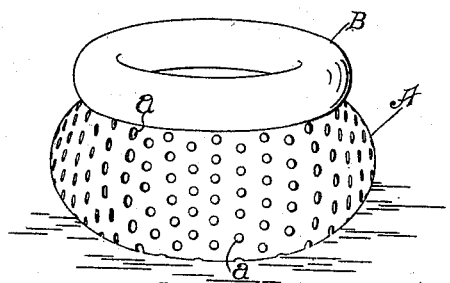
Witnesses
Perry Kingman.
Alfred S. Townsend.
Inventor
Caroline Amelia White
by Hazard & Townsend
her Attys
THE NORRIS PETERS CO., PHOTO-LITHO., WASHINGTON, D. C.

UNITED STATES PATENT OFFICE.

CAROLINE AMELIA WHITE, OF REDONDO BEACH, CALIFORNIA.

TEA-BALL.

SPECIFICATION forming part of Letters Patent No. 627,166, dated June 20, 1899.

Application filed June 26, 1896. Serial No. 597,081. (No model.)

*To all whom it may concern:*

Be it known that I, CAROLINE AMELIA WHITE, a citizen of the United States, formerly residing at Redondo Beach, in the county of Los Angeles and State of California, and now residing at Los Angeles, in said county and State, have invented a new and useful Improvement in Tea-Balls, of which the following is a specification.

My invention relates to float-sustained perforated receptacles for holding tea above the bottom of the teapot while the tea is being steeped, thus to avoid liability of producing a decoction of tannin.

My invention relates to the construction of the tea-ball, whereby I produce a cheaper, lighter, and more easily manufactured tea-ball than heretofore known, and which for a given size will hold a larger quantity of the saturated and swollen tea-leaves and will hold the same closer to the top of the water in which it is being steeped and will sustain it above the bottom of the teapot with a smaller quantity of water in the teapot than is possible with a like size of other proposed forms of construction with which I am acquainted.

My improved tea-ball comprises a circular float-ring and a hollow flattened semiglobular perforated receptacle with open top side and having the upwardly and inwardly sloping rim of its open mouth tangent with and fastened to the upwardly and inwardly sloping under side of the float-ring, thus providing, with the greatest simplicity, cheapness, and ease of construction, a receptacle which is convenient for filling and emptying and also for cleaning, and will hold a large quantity of the saturated tea-leaves close to the top of the water. The body of the float is circular in cross-section as well as circular in its general form, and is so proportioned to the body of the receptacle that when the receptacle is filled with the saturated tea and is in water the float will not be submerged, but will project above the surface of the water.

The accompanying drawings illustrate my invention.

Figure 1 is a vertical mid-section showing the tea-ball in use in a teapot. Fig. 2 is a perspective view of the tea-ball ready for use.

This form of tea-ball is preferably made of aluminium, but may be made of other metal, and the receptacle for the tea may be of wire-gauze formed into flattened semiglobular shape.

A indicates the flattened globular or globoid receptacle for the tea.

B indicates the circular float-ring, circular in cross-section, fitted to and fastened to the open side of the receptacle in the manner above set forth to sustain the receptacle and its contents in the water. The flattened globoid receptacle A is open-mouthed and the float-ring B fits onto and is fastened to the sloping rim of the mouth of the receptacle, and the opening through the ring is of less diameter than the body of the receptacle, so that the upper rim of the receptacle *a* joins the float at a tangent with the circle of the cross-section of the ring B, so that it fits against the ring and can be easily secured by solder.

*a* indicates holes in the receptacle. They may be of any convenient form or shape.

The body A of the receptacle is preferably formed of an integral pressed-metal sheet and is elliptical in vertical cross-section and open at top to fit the under side of the circular float-ring.

It is to be understood that my invention may be used with coffee in the same way as with tea, thus allowing the coffee-grounds to be removed as soon as the infusion has reached the required strength.

The globoid form of the receptacle peculiarly fits the rim of its open mouth to the under side of the circular float-ring, the inner face of the rim of the receptacle being tangent with the inner wall of the ring, as shown in Fig. 1 of the drawings. The globoid receptacle can be spun or given its form by any of the well-known mechanical methods and fastened to the float by solder.

Now, having described my invention, what I claim as new, and desire to secure by Letters Patent, is—

1. The tea-ball comprising a circular float-ring, the body of which is circular in cross-section and also circular in its general form and a hollow globoid perforated receptacle open at the top and having the upwardly and inwardly sloping walls of its rim tangent with the upwardly and inwardly sloping inner wall of the ring and soldered thereto.

2. A tea-ball in which the main body of the receptacle is formed of an integral pressed-metal sheet elliptical in vertical cross-section and open at the top and fitted to the under side of a circular float-ring which is circular in cross-section to form a neck for the tea-ball, substantially as set forth.

CAROLINE AMELIA WHITE.

Witnesses:
JAMES R. TOWNSEND,
ALFRED I. TOWNSEND.